United States Patent [19]

Gardner

[11] Patent Number: 5,229,765
[45] Date of Patent: Jul. 20, 1993

[54] SP NOISE CANCELLATION TECHNIQUE

[75] Inventor: Wallace R. Gardner, Houston, Tex.

[73] Assignee: Halliburton Logging Services, Inc., Houston, Tex.

[21] Appl. No.: 697,174

[22] Filed: May 8, 1991

[51] Int. Cl.$^5$ .......................... G01V 1/40; G01V 3/00
[52] U.S. Cl. ............................. 340/853.2; 340/855.4; 324/351; 367/25; 367/45
[58] Field of Search ............... 340/853, 856, 857, 858, 340/859; 367/25, 43, 45; 324/351

[56] References Cited

U.S. PATENT DOCUMENTS

| | | | |
|---|---|---|---|
| 4,415,895 | 11/1983 | Flagg | 340/856 |
| 4,451,790 | 5/1984 | Bravenec | 324/351 |
| 4,604,738 | 8/1986 | Aggarwal et al. | 367/135 |
| 4,750,156 | 6/1988 | Abrams et al. | 367/45 |
| 4,757,516 | 7/1988 | Yoshimoto et al. | 367/45 |
| 4,980,682 | 12/1990 | Klein et al. | 340/855 |

Primary Examiner—Ian J. Lobo
Attorney, Agent, or Firm—William J. Beard

[57] ABSTRACT

An adaptive transversal filter is incorporated with an SP conductor extending through a logging cable to the surface from an SP electrode supported on a sonde. This logging cable is operated in a noisy environment and there is the risk of noise on the logging cable obscuring the SP signal. The SP signal is obtained at the surface and is passed through a filter system. One input to the filter system utilizes an AC ammeter connected to the AC power source for the logging cable and that signal is input to a multi-stage adaptive transversal filter. The filter output is a recreation of the noise imposed on the SP conductor and when summed with the SP output signal, provides a signal which is substantially noise free.

15 Claims, 2 Drawing Sheets

SP NOISE CANCELLATION TECHNIQUE

BACKGROUND OF THE DISCLOSURE

In a logging system, the logging cable customarily encloses a plurality of conductors. A common cable arrangement is deployment of seven conductors in an armored logging cable which has a strength member suitable for supporting the cable at great depths in a well borehole. Indeed, the multi-conductor cable is normally wrapped around a spool or drum to store upwards of 25,000 feet of cable to thereby enable suspension of a logging tool in the well subjected to logging. Ordinarily, this involves a logging tool which is lowered rapidly into the deep well at various stages of drilling, usually in open hole, and usually exposing the cable to the elevated temperatures found at the bottom on the well. The circumstances and conditions in which the cable is used creates problems as will be described.

The logging tool incorporates multiple logging devices. One of the logging devices in common use is a resistivity log. Another logging device is an electrode which provides the spontaneous potential of the formation adjacent the logging tool, or in other words, an SP measurement. As will be understood, SP measurements are relatively small, less than one volt and typically just a fraction of a volt. The logging cable will support a sonde which incorporates one or more tools in the sonde. A resistivity logging tool requires substantial electric current to create fields near the sonde which extend into the adjacent formations to controlled depths, thereby measuring formation resistivity. In the logging cable, the currents can therefore be substantial to power this equipment. Assume for purposes of illustration that the logging cable is 25,000 feet in length, and further assume that it is used at the surface on a winter day when the logging cable at the surface has a temperature of approximately 0° F. As this cable is unspooled rapidly to lower the sonde into the well bore, the lower portions of the cable will be heated substantially, perhaps even as high as 300° F. into hot formations. The rapid movement of the cable, the cable being deployed in the well from coiled storage on the storage drum and the rapid exposure of a portion of the cable to such high temperatures creates increasing noise in the cable. Moreover, assuming that an SP electrode is included in the logging tool, signals from the SP electrode are coupled up one of the individual conductors in the logging cable. As will be understood, this noise is coupled to the surface and may obliterate the SP signal on that particular dedicated conductor in the cable.

Some portion of this noise is derivative from noise which can be separately observed at the surface. The noise at the surface is in part dependent on the current which is supplied to the logging cable. Of course, this is an AC current because substantial AC power is required to operate the equipment in the sonde, and particularly to operate the resistivity logging equipment in the sonde. Accordingly, the surface currents provided to the cable from the power supply carry some indicia of the noise which will be observed on the SP signal. Indeed, this noise signal is in some measure impressed on the conductor dedicated to the SP signal. Sad to say, a direct proportional relationship between the noise measured at the surface and the noise observed on the SP conductor is not readily discernible. In other words, simple direct subtraction of the surface noise signal from the noise laden output signal on the SP conductor is not sufficient. Rather, the signal on the SP conductor is in fact obscured with noise which is related to the surface observed noise from the power supply in a more complex fashion, and the present system provides an adaptive transversal filter for removal of noise in the signal. When implemented, the surface current flow from the power supply to the cable can then be observed and measured so that this signal, appropriately passed through the filtering system to be described, can then construct a constructed signal which is subtracted from the SP conductor signal for noise cancellation purposes. This provides a sufficiently pure SP signal.

The present disclosure is therefore directed to a system which furnishes an SP output signal after noise subtraction. This takes into account the variable coupling which occurs as a function of the variable current flow in the logging cable and the other factors which vary in use of the logging cable. The logging cable thus picks up the noise which is provided at the surface, subject to subtraction through the filtering system just described, and a reconstructed SP output signal is then formed.

In further detail, the present apparatus utilizes an AC ammeter at the surface connected to the surface power supply. That meter provides a signal to a current to voltage converter which then provides a signal to an analog to digital converter. In digitized form, a procession of measurements having the form of digital words is input to a serial transversal filter. That filter assists in forming an output signal which sums up the noise signal component. In addition to that, the logging cable has an SP output signal which is laden with noise. That signal is passed through an ADC and is converted into an output signal in digital form which is the sum of two signals components, one being the SP signal itself and the other is the noise portion added to it. That SP output signal is added to the signal output from the adaptive transversal filter so that the SP signal can be reconstructed and is then output with substantial noise cancellation.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
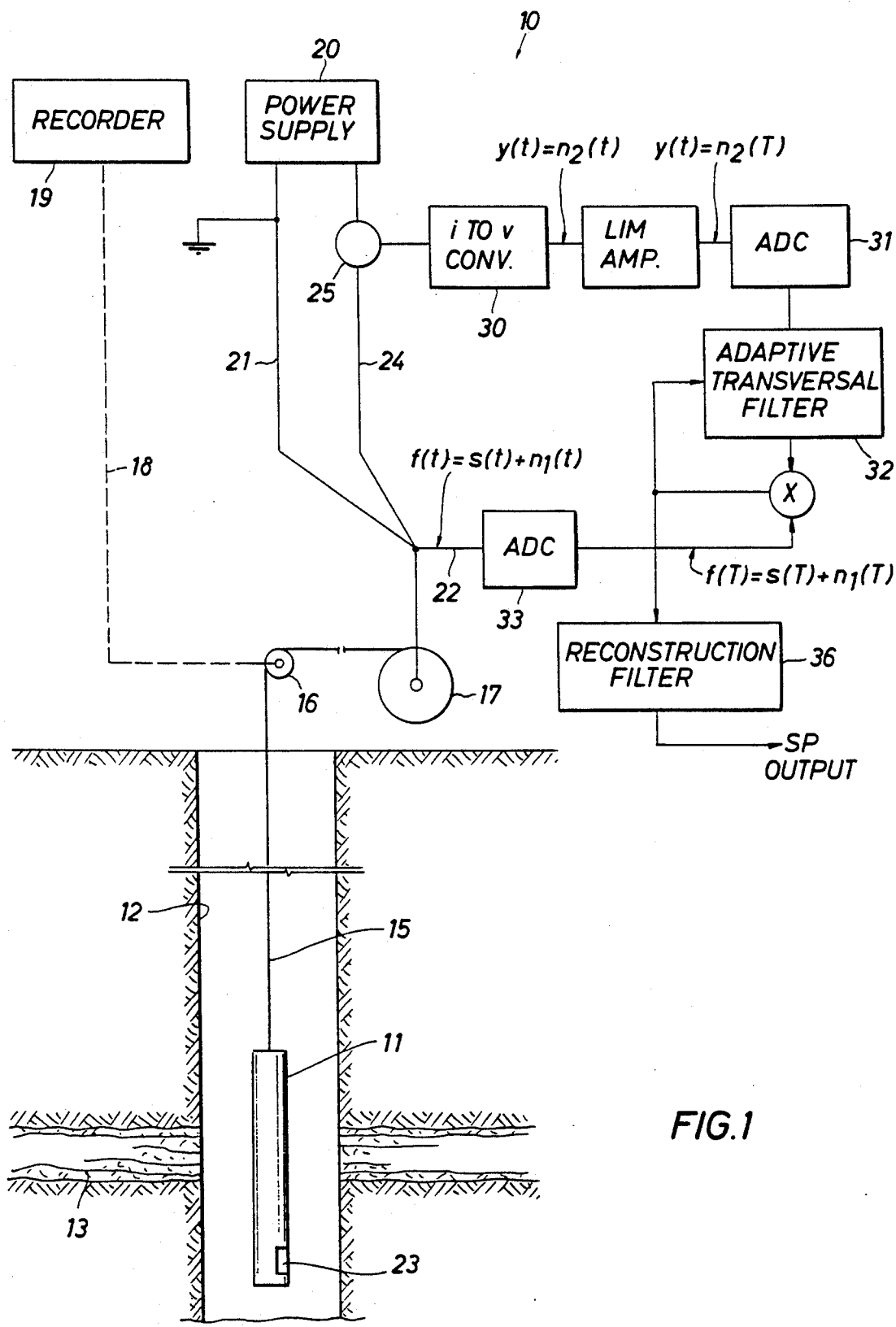
FIG. 1 is a schematic wiring diagram showing the SP noise cancellation system of the present disclosure connected with an AC ammeter at the surface for measurement of current to the logging tool suspended on a multi-conductor logging cable and further showing exemplary conductors in the logging cable which provide the SP signal to the surface over one of the conductors subject to noise, and further showing an adaptive transversal filter for noise reduction.

Attention is directed to FIG. 1 of the drawings where the numeral 10 identifies the modified logging system of the present disclosure. It is constructed for use with an elongate sonde 11 which is shown suspended in a well borehole at 12 to log the well including a particular formation 13. The sonde is supported on an armored logging cable 15 which extends the length of the well borehole to support the sonde at the depth controlled by surface located equipment. The logging cable extends to the surface and passes over a sheave 16 and is spooled on a supply drum 17. The logging cable is a multi-conductor cable, the preferred form having seven conductors. The cable further includes an armored wrapping or jacket around it and a strength member sufficiently strong to support the weight of the equipment and cable when suspended in the well. The numeral 18 identifies a depth measuring device which is connected to the sheave 16 and which provides a depth measurement to a recorder 19. The recorder 19 also receives several signals to be recorded as a function of depth in the well borehole. One of these signals is the SP signal which is provided by the present equipment as will be described.

The surface located equipment includes a power supply 20 which is connected to the logging cable and which enables electrical power to be furnished to the sonde which is supported in the well. The logging cable has a conductor which will be denoted as the ground conductor 21. It has another conductor which is identified at 22. This conductor provides an output from an SP electrode 23 supported on the sonde 11. In addition, the power supply also provides an AC current on two conductors at 24 and 26, these conductors being connected with an AC ammeter 25. This meter measures the current flow. The current fluctuates instantaneously over time because it is an AC current; it also fluctuates with variations in load. The current can be quite sizeable. Moreover, the current flows through conductors which are wrapped in a common sheath with the SP signal conductor 22. Assuming common values, the SP electrode provides a signal which is only a fraction of a volt; even after it is amplified, it is still relatively small and is subject to degradation as a result of noise from conditions prevailing in actual use. One aspect of the noise is one portion attributable to the AC currents flowing in the logging cable immediately adjacent to or in the sheath of the logging cable 15. That is, the conductor 22 is parallel to the AC current flow in the conductor 24 of the logging cable.

This parallel positioning of all the conductors in the logging cable engenders cross talk between the conductors. This cross talk is especially common in light of the fact that the AC current might be quite large while the current flow in the SP conductor 22 is quite small. In any case, the signal observed at the surface output of the SP conductor includes the SP signal as well as signals derivative from noise.

The present apparatus is a system which reduces the noise by creating a subtractive component. Surface current measurements can be obtained at the AC ammeter 25 and those measurements can superficially be subtracted. However, the noise that is picked up on the cable is infinitely more varied than such a linear relationship might otherwise infer; that is, the actual noise measured is a function of many variables and cannot simply be cancelled by creating a surface measured signal which is proportionate to the current applied to the AC conductors in the logging cable.

The present equipment utilizes an adaptive transversal filter. This filter is installed in FIG. 1 and is provided with signals derivative of the surface current flow. To this end, the AC ammeter provides current measurements. These measurements are converted into voltage measurements by a converter 30. The signal, if excessively pure, is input through a nonlinear device to create a rich spectrum of harmonic content. The device can be any kind of nonlinear device such as a limiter, a signal clipping amplifier, and the like. In this version a nonlinear amplifier will suffice. The harmonic rich output signal is input to an ADC 31 which forms an output comprising a serial procession of digital words. That signal in turn in provided to an adaptive transversal filter 32. Separately, the SP conductor 22 is input to an ADC 33 to form an output signal connected to a summing circuit 34. The summing circuit 34 is provided with the output of the adaptive transversal filter circuit 32. The circuits 32 and 33 thus provide signals which are summed and a difference signal is created. The difference signal is then applied back to the transversal filter circuit by feedback through that circuit, and the signal is input to a reconstruction filter 36 so that the SP signal is formed.

Considering that in greater detail, several equations may be developed. For purposes of definition Equation 1 defines the output from the SP conductor 22. This signal which is f(t) has a noise component, and also an SP signal component which is denoted as s(t). The noise component is represented by the symbol $n_1(t)$. Thus, Equation 1 shows how the SP signal is burdened with the addition of noise to that signal. Equation 1 reads:

$$f(t) = s(t) + n_1(t) \tag{1}$$

As will be observed, Equation 1 provides the pure SP signal if the noise component can be removed. The noise component however is not originally known, and therefore it cannot be simply subtracted for easy removal. This analog signal of Equation 1 is input to the ADC 33 which then provides a digitized form of that signal which is output at a time gated sequence. Accordingly, Equation 2 describes the discrete samples which make up the signals of Equation 1; Equation 2 is the digitized form of Equation 1 and Equation 2 reads:

$$f(T) = s(T) + n_1(T) \tag{2}$$

Equation 3 describes the signal from the AC ammeter 25. Again, this is an analog signal but it is processed through the ADC 31 to have the form of Equation 4 which is a series of digital words having a discrete spacing between words. As will be understood, Equation 4 describes the AC noise on the power supply current. Equations 3 and 4 provide:

$$y(t) = n_2(t)$$

$$y(T) = n_2(T)$$

There is obviously some correlation between the two noise components; that is, $n_1(T)$ is in some fashion related to $n_2(T)$. This correlation, however, is not precisely linear because it is a function of many complicated variables relating to the physical deployment and movement of the logging cable, ambient temperature, downhole temperature, shielding in the cable, size of the current in the cable, and other factors.

Referring to text by Honig and Messerschmitt, *Adaptive Filters; Structure, Algorithms and Applications* and in particular chapters 3 and 4 of the book, one may define the mean-square error as E[e (T)] where Equation 5 involves the term $n_3(T)$ which is the noise at the output of the adaptive filter as will be described in detail. Equation 5 provides:

$$e(t) = f(T) - n_3(T) \tag{5}$$

Logic dictates that the SP signal represented by s(T) does not correlate with either of $n_2(T)$ or $n_3(T)$. Accordingly, the mean-square error function is included in Equation 6 on the left side and represents the sum of the terms on the right side of the equation. The first term is derived from s(T) and that is a constant; one may therefore observe that the last term of Equation 6 is the term of interest, and that term is best reduced to a minimum. Observing the last term of Equation 6, the optimum condition is obtained if $n_3(T$ is a replica of $n_1(T)$. Equation 6 reads as follows:

$$E[e^2(T)] = E[s^2(T)] + E[(n_1(T) - n_3(T))^2] \tag{6}$$

Figure 2:
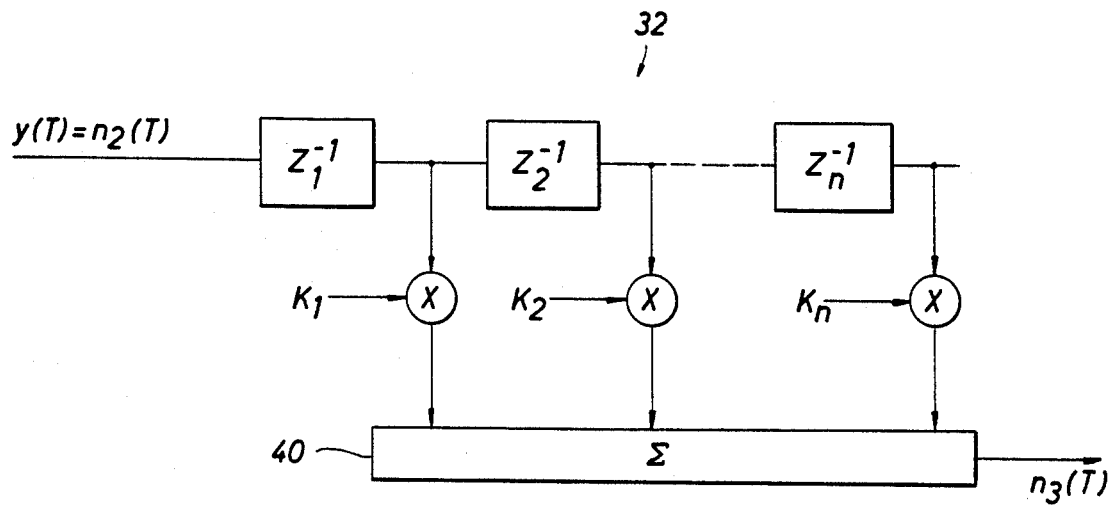
FIG. 2 is a detailed view of the transversal filter of FIG. 1.

As a generalization, the goal suggested by Equation 6 is to make $n_3(T)$ replicate $n_1(T)$. This is accomplished by the system shown above. This can be more readily understood by a review of FIG. 2 of the drawings. There, the adaptive transversal FIG. 32 is shown in greater detail. It has a number of stages which is represented by the number n and it has stages which are provided with the serialized digitized measurements of the signal from the AC ammeter 25. These signals are input to the serial buffers indicated generally at $z_1, z_2, \ldots Z_n$. Each of these buffered values is multiplied by some selected constant; in view of the fact that there are n stages in the filter at 32, the constants are represented by the series $k_1, k_2, \ldots k_n$. All of these connect with a summing circuit as shown in FIG. 2 which provides an output which is denoted as $n_3(T)$. For purposes of nomenclature, the summing circuit is identified by the reference numeral 40.

Figure 3:
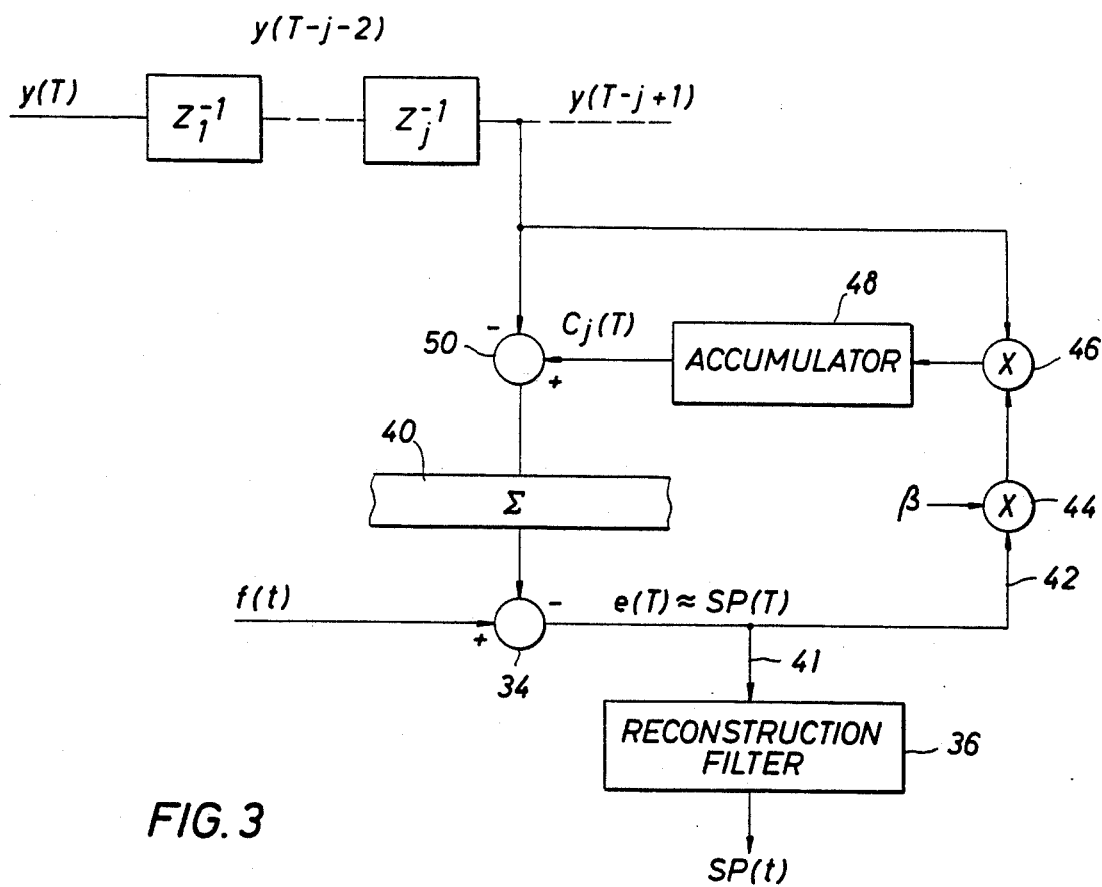
FIG. 3 shows how the filter of FIG. 2 incrementally continues to adjust coefficients of the filter taps to optimize noise reduction.

FIG. 3 shows greater detail of the filter and further incorporates the reconstruction filter 36 which is also shown. FIG. 3 thus provides an output signal on the conductor 41 to the reconstruction filter. That is from the summing circuit 34. As shown, the conductor 42 is the feedback path. That is provided to a multiplier circuit 44 where the amount of feedback is multiplied by a factor known as β and is typically a positive number which is more than zero but less than one. The feedback loop further includes the multiplier 46 which is provided with the feedback signal on the conductor 41 thorough the conductor 42 and, after multiplication by β, that signal is then input to an accumulator 48 connected with a multiplier 50 and the summing circuit 40. The typical transversal filter has a number of stages where n can be as low as 6, but is preferably around 12 and it can be higher. As the filter length increases in stages, it becomes somewhat more complex and also requires a few more steps to make adjustments after changes dynamically observed in operation. This filtering approach provided with the digital inputs at a timed sequence (e.g., one sample every millisecond) can then recreate the SP signal as a function of time and provide the output from the reconstruction filter 36.

Considering the present device in operation, and taking into account the description of the adaptive transversal filter mentioned above, the desired goal is to continuously adjust the operation of the filters so that $n_3(T)$ is a dynamically changing but accurate replica of $n_1(T)$. By so doing, Equation 6 shows how the last term of the equation is substantially reduced, ideally being reduced to zero. Therefore, this provides a reduced mean-square error signal in accordance with Equation 6, and ideally, one can then recover the SP signal represented by s(T).

In summarizing the present apparatus, it will be understood how the adaptive transversal filter having n stages (where n is typically in the range of about 6 to 16)provides a recovered SP signal with reduced noise. The present apparatus is therefore described in the foregoing directed to the preferred embodiment, but the scope is determined by the claims which follow.

What is claimed is:

1. A method of reducing noise mixed with a low voltage signal on a conductor of a logging cable comprising the steps of:

(a) connecting a power supply at the surface of a well to a power conductor in a logging cable to provide power to a logging tool on the remote end of the logging cable;

(b) forming a surface signal at the surface related to current flow in the power conductor;

(c) performing logging operations at the logging tool and forming an analog output signal of the logging operations;

(d) conducting the logging output signal along a signal conductor in the logging cable to the surface;

(e) digitally filtering the surface signal from step b through a multistage filter of variable weights to obtain a subtractive signal; and (f) subtracting the subtractive signal from the logging output signal to obtain an analog output signal representative of the logging operation with reduced noise content.

2. The method of claim 1 wherein the signal formed at the surface and which is related to current flow is an analog signal, and that signal is converted into an analog voltage signal, and is thereafter periodically sampled to form a procession of digit sample words.

3. The method of claim 1 wherein the step of performing logging operations includes positioning a spontaneous potential electrode against formations adjacent the well borehole to form the logging output signal.

4. The method of claim 3 including the step of providing the logging output signal along the signal conductor as an analog signal, and, at the surface, converting that signal into a series of digital words representing spaced values thereof.

5. The method of claim 4 further including the step of providing the digital words to a summing means which comprises the step of substracting the subtractive signal to obtain an analog output signal representative of the logging operation.

6. The method of claim 1 including the step of defining a digital transversal filter comprised on n stages where n is whole number integer in the range of about 6 to about 16 and digitized values comprising serially provided digital words are input thereto and advanced and advanced through the n stages in sequence, and the values in each stage are multiplied by selected constants to provide a sum from operation of the filter.

7. The method of claim 6 where n is 12.

8. The method of claim 6 wherein the constants used in multiplication of the n stages are periodically adjusted to control the amount of each stage summed.

9. The method of claim 8 including a feedback wherein the constants are continuously modified.

10. The method of claim 9 wherein the feedback sequence includes positive and negative adjustments thereto.

11. A logging system for performing a logging operation in a well borehole, comprising:

(a) a multiple conductor logging cable supporting a logging tool at the lower end thereof;

(b) analog signal forming means at said logging tool for forming a variable signal indicative of logging operations wherein the signal is provided at the surface of the well on a conductor in said logging cable;

(c) a power supply at the surface connected to a power conductor in said logging cable to provide power for operation of the logging tool on said logging cable wherein the transfer of power to said logging tool creates noise along the cable added to said analog signal;

(d) means for forming a surface located signal related to the current flow from said power supply;

(e) transversal filter means provided with the surface located signal to form a signal indicative of noise content in the analog signal for logging operations; and (f) means subtracting the signal of said filter means from the analog signal to form a signal having reduced noise content.

12. The apparatus of claim 11 wherein said power supply provides AC current at a variable current flow, and said current is communicated over a conductor in said logging cable to the logging tool for operation thereof, and further wherein current flow is through an ammeter comprising said means for forming a surface located signal.

13. The apparatus of claim 12 wherein said logging tool supports a spontaneous potential electrode which forms an output signal which comprises said analog signal forming means.

14. The apparatus of claim 11 wherein the variable signal from said analog signal forming means provided at the surface is connected to an analog to digital converter to form a series of digital words representing measurements of the analog signal, and further wherein the surface located signal related to current flow is also an analog signal and is provided to an analog to digital converter means for conversion into a series of digital words, and such words are then input to said transversal filter means.

15. A logging system for performing a logging operation in a well borehole comprising:

(a) a multiple conductor logging cable supporting a logging tool at the lower end thereof;

(b) SP electrode means carried on said logging tool for forming an SP signal output therefrom wherein the signal is connected to a signal conductor in said logging cable extending to the surface and output at the surface;

(c) digitizing means for converting the SP signal into a series of digital words representing the value of the SP signal;

(d) signal forming means connected to other conductors in the multiple conductor logging cable at the surface for forming an output representative of signals on such other conductors in the logging cable which create conductor crosstalk between conductors of said logging cable, and forming an output analog signal thereof;

(e) means for digitizing said signal; and (f) means operative on the digitized surface output signal to form a subtractive signal indicative of noise on the SP signal resulting from conduction of the SP signal along the logging cable exposed to noise from signals flowing in other conductors of the logging cable.

* * * * *